(12) United States Patent
Rakow et al.

(10) Patent No.: US 9,021,437 B2
(45) Date of Patent: Apr. 28, 2015

(54) DECLARATIVE STYLE RULES FOR DEFAULT TOUCH BEHAVIORS

(75) Inventors: Matthew A. Rakow, Seattle, WA (US); Tony E. Schreiner, Redmond, WA (US); Bradley J. Litterell, Bellevue, WA (US); Kevin M. Babbitt, Sammamish, WA (US); Praveen Kumar Muralidhar Rao, Sammamish, WA (US); Justin E. Rogers, Redmond, WA (US); Sylvain P. Galineau, Seattle, WA (US); Arron J. Eicholz, Enumclaw, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 13/548,913

(22) Filed: Jul. 13, 2012

(65) Prior Publication Data

US 2014/0019844 A1 Jan. 16, 2014

(51) Int. Cl.
*G06F 9/44* (2006.01)
*G06F 11/00* (2006.01)
*G06F 11/36* (2006.01)

(52) U.S. Cl.
CPC ................................. *G06F 11/3668* (2013.01)

(58) Field of Classification Search
CPC .................................................... G06F 11/3668
USPC ..................................... 717/124–135; 714/25
See application file for complete search history.

(56) References Cited

U.S. PATENT DOCUMENTS

| | | | | |
|---|---|---|---|---|
| 5,692,142 A | * | 11/1997 | Craycroft et al. | 715/744 |
| 5,838,315 A | * | 11/1998 | Craycroft et al. | 715/866 |
| 6,049,325 A | * | 4/2000 | Alexander | 345/157 |
| 6,229,525 B1 | * | 5/2001 | Alexander | 345/157 |
| 6,954,218 B2 | * | 10/2005 | Stall | 345/654 |
| 7,453,473 B2 | * | 11/2008 | Stall | 345/654 |
| 7,716,685 B2 | * | 5/2010 | Schechter et al. | 719/328 |
| 7,864,163 B2 | | 1/2011 | Ording et al. | |
| 8,176,096 B2 | * | 5/2012 | Allyn et al. | 707/805 |
| 8,874,969 B2 | * | 10/2014 | Rakow et al. | 714/38.1 |
| 2002/0075327 A1 | * | 6/2002 | Stall | 345/853 |
| 2003/0041070 A1 | * | 2/2003 | Thompson et al. | 707/103 R |
| 2005/0229108 A1 | * | 10/2005 | Sadek et al. | 715/764 |
| 2006/0227116 A1 | * | 10/2006 | Zotov et al. | 345/173 |

(Continued)

OTHER PUBLICATIONS

"Compositor (Touch) Hit Testing", Retrieved from <http://www.chromium.org/developers/design-documents/compositor-hit-testing> on May 10, 2013, 3 pages.*
"Direct Manipulation", Retrieved from <http://msdn.microsoft.com/en-us/library/windows/desktop/hh446969(v=vs.85).aspx> on Apr. 12, 2013, (Oct. 27, 2012), 6 pages.*

(Continued)

*Primary Examiner* — Qing Chen
(74) *Attorney, Agent, or Firm* — John Jardine; Kate Drakos; Micky Minhas

(57) ABSTRACT

In at least some embodiments, a mechanism is provided for web developers to request specific default behaviors, such as touch behaviors, on their webpages. In at least some implementations, a Cascading Style Sheets (CSS) rule is utilized to enable or disable manipulations such as panning, pinch zoom, and double-tap-zoom manipulations. The mechanism can be extensible to accommodate additional default behaviors that are added in the future. In various embodiments, the behaviors are declared upfront and thus differ from solutions which employ an imperative model. The declarative nature of this approach allows achievement of full independence from the main thread and deciding the correct response using independent hit testing.

20 Claims, 6 Drawing Sheets

(56) References Cited

U.S. PATENT DOCUMENTS

| | | |
|---|---|---|
| 2007/0061733 A1* | 3/2007 | Schechter et al. ............ 715/740 |
| 2007/0288841 A1 | 12/2007 | Rohrabaugh et al. |
| 2008/0011819 A1* | 1/2008 | Patil et al. .................... 235/375 |
| 2009/0217187 A1* | 8/2009 | Kendall et al. ................ 715/765 |
| 2009/0225038 A1 | 9/2009 | Bolsinga et al. |
| 2010/0162152 A1* | 6/2010 | Allyn et al. ................... 715/767 |
| 2010/0306743 A1* | 12/2010 | Underseth .................... 717/124 |
| 2011/0035663 A1 | 2/2011 | Moon et al. |
| 2011/0072390 A1 | 3/2011 | Duga et al. |
| 2011/0254792 A1 | 10/2011 | Waters et al. |
| 2012/0056819 A1* | 3/2012 | Peterson et al. ............. 345/173 |
| 2012/0174079 A1* | 7/2012 | Luh ................................ 717/135 |
| 2013/0067314 A1* | 3/2013 | Rogers et al. ................. 715/234 |
| 2013/0227397 A1* | 8/2013 | Tvorun et al. ................. 715/235 |
| 2014/0013160 A1* | 1/2014 | Rakow et al. ................... 714/32 |

OTHER PUBLICATIONS

Begemann, Ole "CGPath Hit Testing", Retrieved from <http://oleb.net/blog/2012/02/cgpath-hit-testing/> on May 13, 2013, (Feb. 3, 2012), 5 pages.*

"Hit Testing with Transform Sample", Retrieved at <<http://silverlight.pmconsult.com/HitTestWithTransform/TestPage.jtml>>, Retrieved Date: Mar. 12, 2012, pp. 03.*

"C#, WPF—Hit Testing Example", Retrieved at <<http://rongchaua.net/blog/c-wpf-hit-testing-example/>>, Aug. 27, 2010, pp. 07.*

"CSS", Retrieved at <<http://msdn.microsoft.com/en-us/library/ie/hh673536(v=vs.85).aspx, Retrieved Date : Mar. 9, 2012, pp. 1-13.

"Handling Events", Retrieved at <<https://developer.apple.com/library/ios/DOCUMENTATION/AppleApplications/Reference/SafariWebContent/SafariwebContent.pdf>>, Retrieved Date: Mar. 9, 2012, pp. 1-118.

* cited by examiner

DECLARATIVE STYLE RULES FOR DEFAULT TOUCH BEHAVIORS

BACKGROUND

Hit testing refers to a process that determines content that is located at a given set of coordinates in web content, such as a webpage. A common scenario for hit testing pertains to that which involves user input, e.g., receiving touch input or mouse click input. Specifically, in order to determine a correct response to user input, hit testing is performed to discover which content is the subject of the user's interaction. Anything that delays a hit test can, in turn, delay the system's response and degrade the user's experience.

In many systems, hit testing is performed on a main thread, for example, the user interface thread. The user interface thread can, however, frequently be busy performing other work. This other work can include JavaScript execution, layout tasks, rendering operations, and the like. As a result, hit tests that occur on the main thread may be blocked for prolonged and variable periods of time.

SUMMARY

This Summary is provided to introduce a selection of concepts in a simplified form that are further described below in the Detailed Description. This Summary is not intended to identify key features or essential features of the claimed subject matter.

In one or more embodiments, a hit test thread which is separate from the main thread, e.g. the user interface thread, is utilized for hit testing on web content. Using a separate thread for hit testing can allow targets to be quickly ascertained. In cases where the appropriate response is handled by a separate thread, such as a manipulation thread that can be used for touch manipulations such as panning and pinch zooming, manipulation can occur without blocking on the main thread. This results in a response time that is consistently quick even on low-end hardware over a variety of scenarios.

In at least some embodiments, a mechanism is provided for web developers to request specific default behaviors, such as touch behaviors, on their webpages. In at least some implementations, a Cascading Style Sheets (CSS) rule is utilized to enable or disable manipulations such as panning, pinch zoom, and double-tap-zoom manipulations. The mechanism can be extensible to accommodate additional default behaviors that are added in the future. In various embodiments, the behaviors are declared up front and thus differ from solutions which employ an imperative model. The declarative nature of this approach allows achievement of full independence from the main thread in deciding the correct response using independent hit testing.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
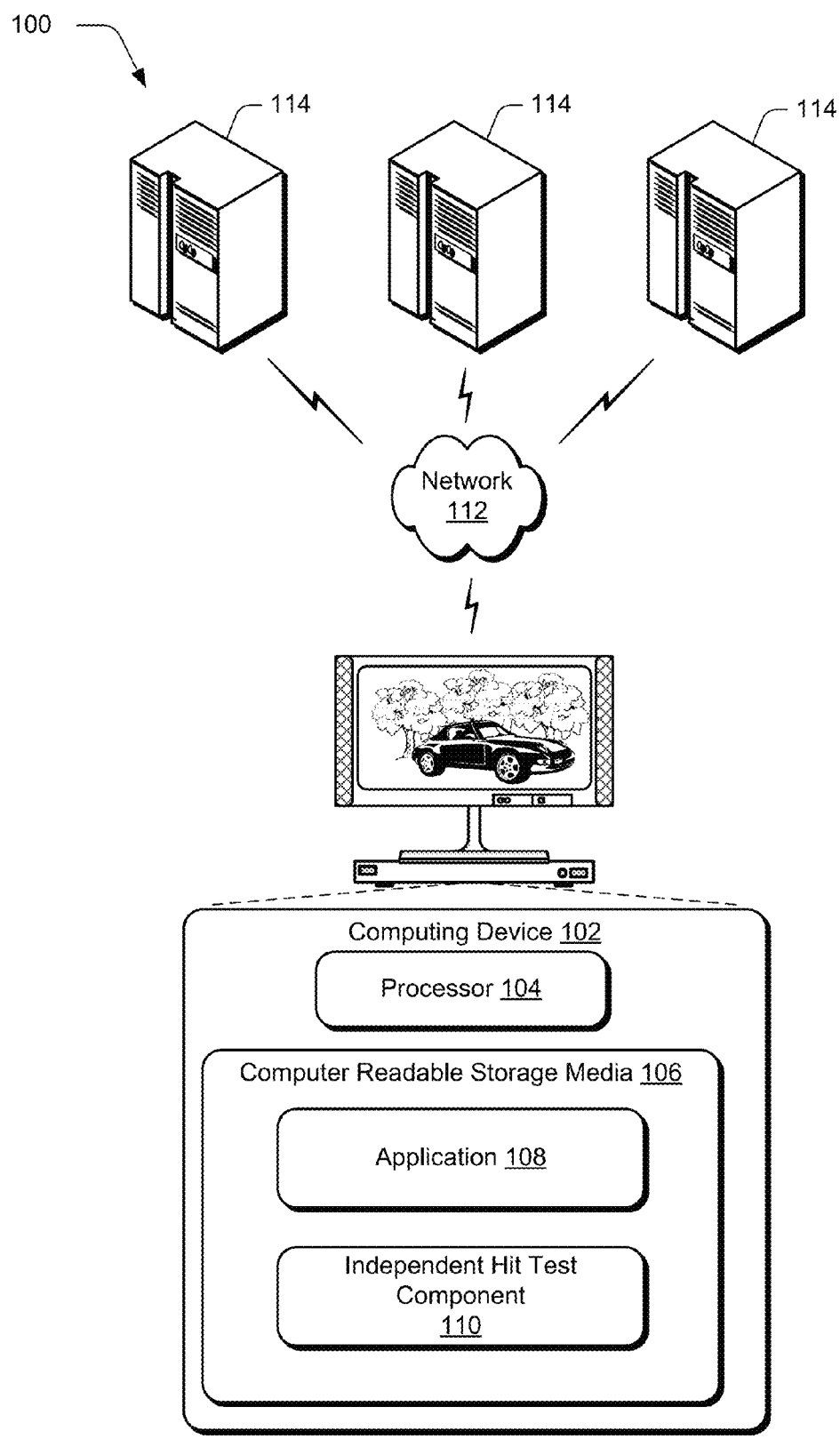
FIG. 1 is an illustration of an environment in an example implementation that is operable to perform the various embodiments described herein.

In one or more embodiments, a hit test thread which is separate from the main thread, e.g. the user interface thread, is utilized for hit testing on web content, here termed "independent hit testing". Using a separate thread for hit testing can allow targets to be quickly ascertained. In cases where the appropriate response is handled by a separate thread, such as a manipulation thread that can be used for touch manipulations such as panning and pinch zooming, manipulation can occur without blocking on the main thread. This results in a response time that is consistently quick even on low-end hardware over a variety of scenarios.

In at least some embodiments, a scoped display tree traversal can be performed during this hit test. This can, in some instances, avoid a full tree traversal to determine an appropriate response. As a result, performance can be improved by skipping irrelevant portions of the display tree.

Further, at least some embodiments enable an ability to designate specific regions of a single display tree node which are to be considered during independent hit testing. This can be used, for example, in cases where a single display tree node has sub-regions of interest that will change the decision about the appropriate response. Such regions of interest can include, by way of example and not limitation, a playback slider on a video element or the resize grippers on editable content.

In yet other embodiments, an application can register a callback handler which will be executed as part of the response to the hit test. This can be used for additional, host-specific actions which go beyond the typical built-in functionality.

In at least some embodiments, a mechanism is provided for web developers to request specific default behaviors, such as touch behaviors, on their webpages. In at least some implementations, a Cascading Style Sheets (CSS) rule is utilized to enable or disable manipulations such as panning, pinch zoom, and double-tap-zoom manipulations. The mechanism can be extensible to accommodate additional default behaviors that are added in the future. In various embodiments, the behaviors are declared up front and thus differ from solutions which employ an imperative model. The declarative nature of this approach allows achievement of full independence from the main thread in deciding the correct response using independent hit testing.

Use of the CSS rule can facilitate application of requested specific default behaviors to many separate regions on a webpage. This can be as simple as setting a CSS class on each region to be configured.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 illustrates an operating environment in accordance with one or more embodiments, generally at 100. Environment 100 includes a computing device 102 in the form of a local client machine having one or more processors 104, one or more computer-readable storage media 106, one or more applications 108 that resides on the computer-readable storage media and which are executable by the processor 104. Computing device 102 also includes an independent hit test component 110 that operates as described below. Computing device 102 can be embodied as any suitable computing device such as, by way of example and not limitation, a desktop computer, a portable computer, a handheld computer such as a personal digital assistant (PDA), mobile phone, television, tablet computer, and the like. Varieties of different examples of a computing device 102 are shown and described below in FIGS. 4 and 5.

Applications 108 can include any suitable type of applications including, by way of example and not limitation, a web browser and/or various other web applications. The web browser is configured to navigate via the network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser, for instance, may be configured to navigate via the network 112 to interact with content available from one or more web servers 114 as well as communicate data to the one or more web servers 114, e.g., perform downloads and uploads. The web servers 114 may be configured to provide one or more services that are accessible via the network 112. Examples of such services include email, web pages, photo sharing sites, social networks, content sharing services, media streaming services, and so on.

One or more of the applications 108 may also be configured to access the network 112, e.g., directly themselves and/or through the browser (in the event an application 108 is not a web browser). For example, one or more of the applications 108 may be configured to communicate messages, such as email, instant messages, and so on. In additional examples, an application 108, for instance, may be configured to access a social network, obtain weather updates, interact with a bookstore service implemented by one or more of the web servers 114, support word processing, provide spreadsheet functionality, support creation and output of presentations, and so on.

Thus, applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources. In addition, the applications can work in offline scenarios as well, e.g., browsing through content from a USB device.

In operation, independent hit test component 110 provides a hit test thread which is separate from a main thread, e.g. the user interface thread. The independent hit test thread is utilized for hit testing on web content that mitigates the effects of hit testing on the main thread. Using a separate thread for hit testing can allow targets to be quickly ascertained. In cases where the appropriate response is handled by a separate thread, such as a manipulation thread that can be used for touch manipulations such as panning and pinch zooming, manipulation can occur without blocking on the main thread. This results in a response time that is consistently quick even on low-end hardware over a variety of scenarios.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware or virtual machines of the computing device 102 to perform operations, e.g., processors, functional blocks, and so on. For example, the computing device 102 may include a computer-readable medium that may be configured to maintain instructions that cause the computing device, and more particularly the operating system and associated hardware of the computing device 102 to perform operations. Thus, the instructions function to configure the operating system and associated hardware to perform the operations and in this way result in transformation of the operating system and associated hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example embodiments that can utilize the principles described herein.

Example Embodiments

In the discussion below, the following terminology is used. The concepts of dependent and independent regions are introduced.

A "dependent region" is a region of web content that utilizes the main thread, i.e., the user interface thread, for hit testing. Dependent regions can be associated with input or "hits" that occur over a control such as <input type="range"> where the interaction with the page does not trigger a manipulation. Other dependent regions can include, by way of example and not limitation, those associated with selection handlers, adorners, scrollbars, and controls for video and audio content. Such dependent regions can also include, by way of example and not limitation, windowless ActiveX controls, where the intent of third-party code is not known.

An "independent region" is a region of web content that does not have to utilize the main thread for hit testing. Independent regions typically include those regions that are normally panned or zoomed by a user.

Figure 2:
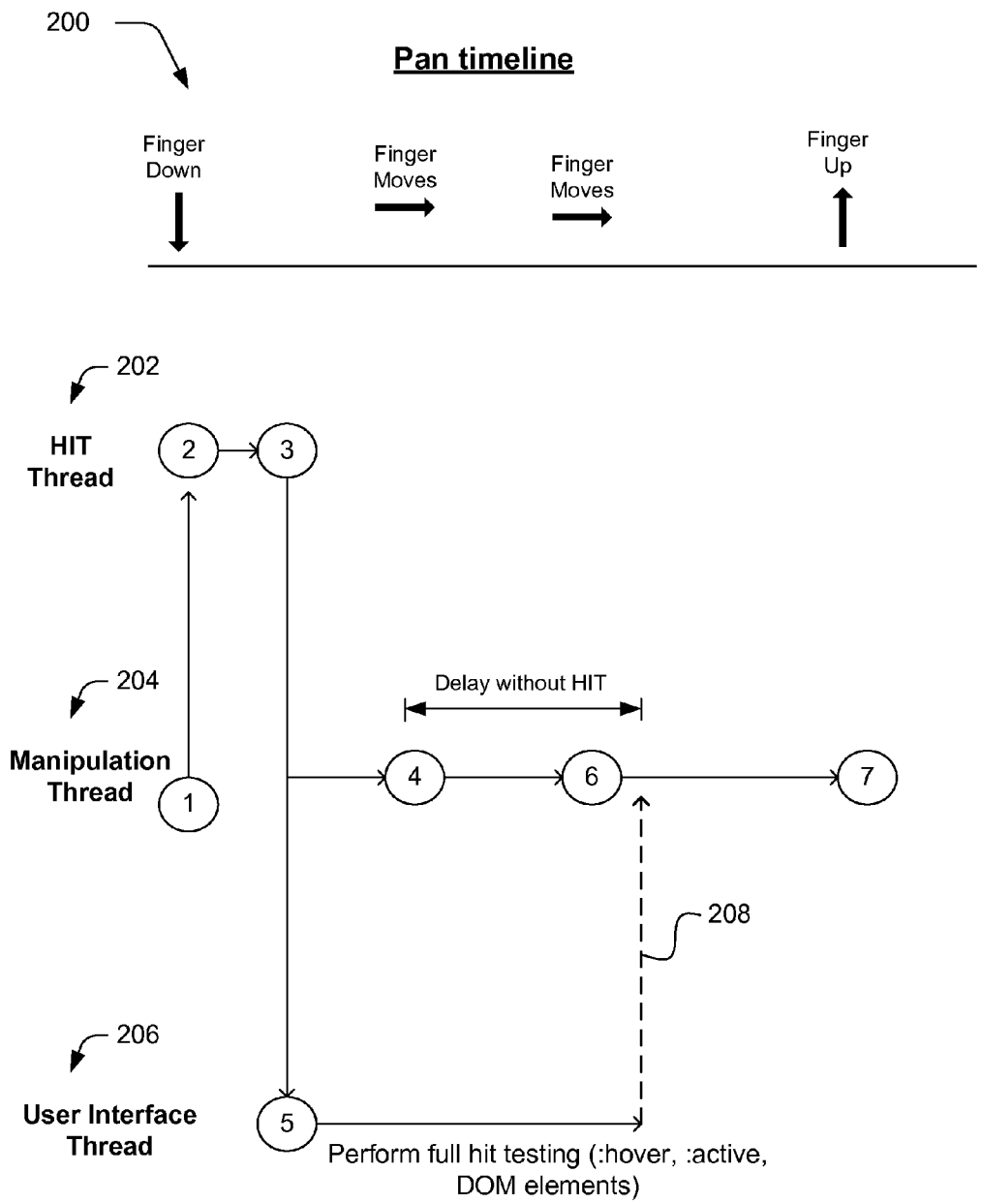
FIG. 2 is a sequence diagram in accordance with one or more embodiments.

FIG. 2 illustrates as example sequence diagram, generally at 200, associated with a pan manipulation in which a user executes a gesture in the form of a "pointer down" gesture with a subsequent slide to pan content. Any suitable type of input can be provided for the pointer down gesture. For example, in the illustrated example the pointer down gesture is executed by the user touch-engaging content displayed on a display screen and moving their finger to execute a pan. Other types of input can be received from, by way of example and not limitation, input devices such as a mouse input, a stylus input, natural user interface (NUI) input and the like. In addition, other manipulations can be processed as described just below. Such other manipulations can include, by way of example and not limitation, pinch zoom manipulations, double tap zoom manipulations, as well as other manipulations without departing from the spirit and scope of the claimed subject matter.

In this example, three different threads are illustrated at 202, 204, and 206. An independent hit test thread 202 constitutes a thread that is utilized to conduct an independent hit test as described above and below. Manipulation thread 204 constitutes the thread that is configured to perform a manipulation for inputs that are received relative to independent regions associated with the displayed content. User interface thread 206 constitutes the main thread that is configured to perform various activities such as full hit testing on dependent regions associated with displayed content.

In one or more embodiments, independent hit testing can operate as follows. The independent hit test thread 202 is aware of regions on the displayed page which are independent and dependent. The manipulation thread 204 serves as or manages a delegate thread that is registered to receive messages associated with various types of inputs. The manipulation thread 204 receives input messages and updates before the user interface thread 206. The independent hit test thread 202 is registered with the manipulation thread 204 to receive input messages from the manipulation thread. When an input is received, the manipulation thread receives an associated message and sends a synchronous notification to the independent hit test thread 202. The independent hit test thread 202 receives the message and uses data contained therewithin to walk an associated display tree to perform a hit test. The entire display tree can be walked or a scoped traversal can take place, as described below. If the input occurs relative to an independent region, the independent hit test thread 202 calls manipulation thread 204 to inform the manipulation thread that it can initiate panning. In at least some embodiments, if the input occurs relative to a dependent region, then the manipulation thread 204 reassigns the input messages to the user interface thread 206 for processing by way of a full hit test. Reassigning the input messages to the user interface thread 206 carries with it efficiencies because the messages are kept in the same queue or location until reassignment occurs, thus keeping the message from being moved in the queue. Dependent regions that are not subject to manipulation based on an independent hit test include, by way of example and not limitation, those regions corresponding to elements including slider controls, video/audio playback and volume sliders, ActiveX controls, scrollbars, text selection grippers (and other adorners), and pages set to overflow.

In at least some embodiments, after an independent hit test is performed or during initiation of the manipulation, the input message that spawned the independent hit test is forwarded to the user interface thread 206 for normal processing. Normal processing is associated with basic interactions such as, by way of example and not limitation, processing that can apply various styles to elements that are the subject of the input. In these instances, forwarding the input message to the user interface thread does not block manipulation performed by the manipulation thread 204.

Returning to the FIG. 2 sequence diagram, a sequence of actions is shown each of which appears in an enumerated circle. The sequence is described in the context of a pan manipulation. It is to be appreciated and understood, however, that independent hit testing can be performed in conjunction with other manipulations such as zoom manipulations and the like. In addition, the input that is the subject of the sequence diagram is in the form of a touch input. As noted above, other types of inputs can be received and processed similarly without departing from the spirit and scope of the claimed subject matter.

At "1" a finger down event occurs responsive to a user touch-engaging an element that appears on a webpage which, in turn, spawns a pointer down input message. The pointer down input message is received by the manipulation thread 204 and placed in a queue. The pointer down input message is then sent by the manipulation thread 204 to the independent hit test thread 202. The independent hit test thread 202 receives, at "2", the pointer down input message. This constitutes a departure from past practices in which the pointer down input message would be sent to the user interface thread 206 which, as described above, could result in delays due to other processing that the user interface thread 206 might be performing. Responsive to receiving the pointer down input message, the independent hit test thread 202 performs, at "3" an independent hit test by walking an associated display tree. If the independent hit test thread 202 ascertains that the region corresponding to the finger down event is an independent region, meaning that the user interface thread 206 is not needed for the manipulation to occur, the independent hit test thread 202 calls the manipulation thread to inform the manipulation thread that direct manipulation can occur. The manipulation thread, at "4" begins the manipulation which, in this example, is a panning manipulation. The independent hit test thread 202 can also, at "3", call the user interface thread 206 so that the user interface thread can perform full hit testing at "5" to do such things as apply CSS styles and other DOM-related processing. If the independent hit test thread ascertains that the region corresponding to the finger down event is a dependent region, the independent hit test thread does not call the manipulation thread for direct manipulation. Instead, the input messages are reassigned by the manipulation thread to the user interface thread for processing. Assuming that the region is an independent region, the manipulation continues at "6", under the influence of the manipulation thread 204, as the user's finger moves. The manipulation thread 204 ends the manipulation at "7" responsive to a finger up event.

Note that without the independent hit test thread 202, the pointer down input message would have been sent to the user interface thread 206 for processing and performing the full hit test before the manipulation could start. Because of other processing that the user interface thread 206 might be performing, the full hit test for purposes of manipulation might be delayed. As such, the manipulation would be initiated after conclusion of the full hit test, as indicated by the dashed arrow 208. This would result in a corresponding delay, indicated by the double-headed arrow, from the time between when manipulation is initiated under the influence of the independent hit test thread and the time when manipulation is initiated without the influence of the independent hit test thread. Accordingly, manipulation response times are improved and are consistently quick, regardless of the activity on the user interface thread 206.

Having considered an example system in accordance with one or more embodiments, consider now an example method in accordance with one or more embodiments.

Example Method

Figure 3:
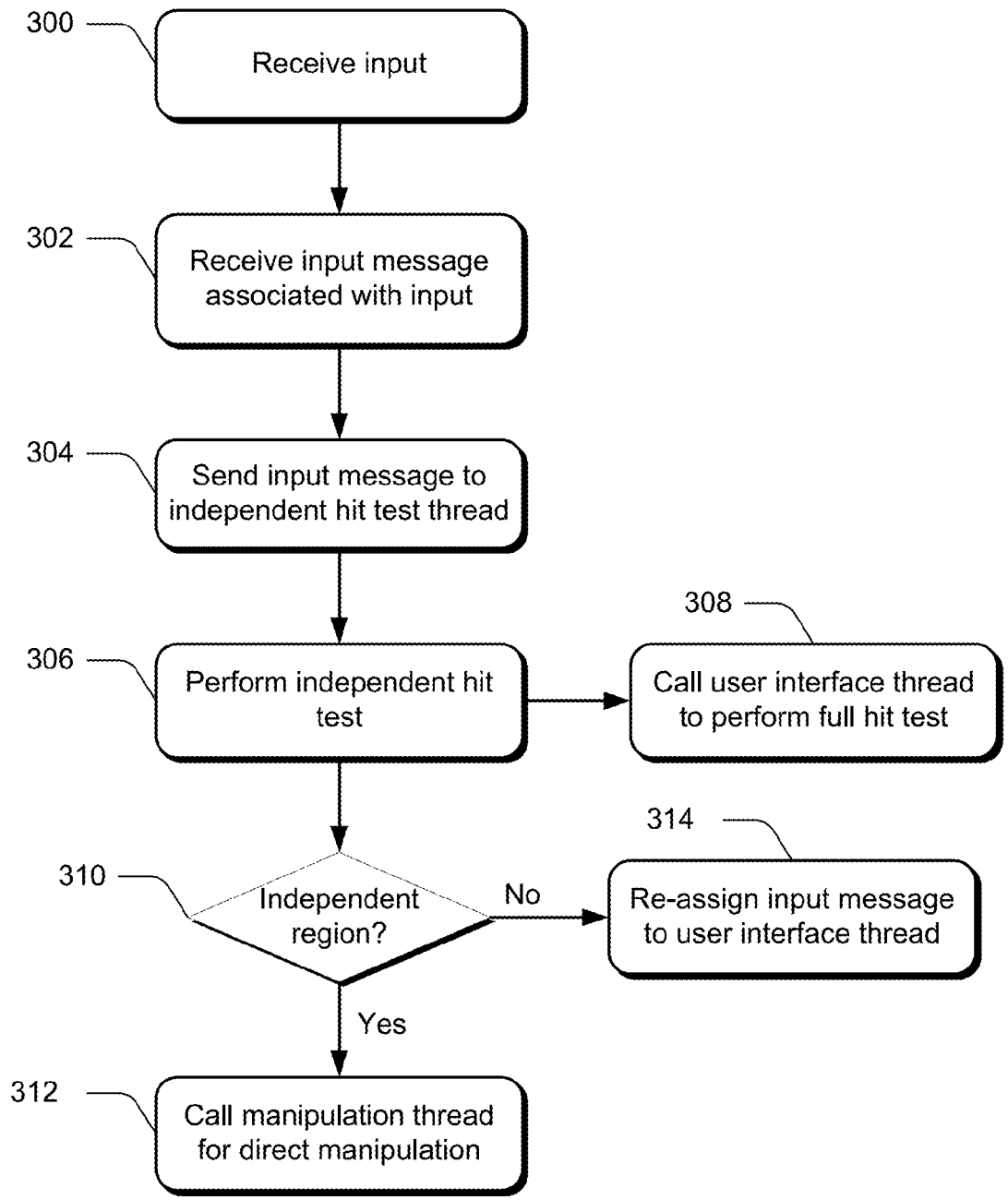
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, the method can be implemented by a suitably-configured system, such as one that includes an independent hit test thread.

Step 300 receives an input. Any suitable type of input can be received. In at least some embodiments, the input comprises a touch input. Other types of inputs can be received without departing from the spirit and scope of the claimed subject matter. Step 302 receives an input message associated with input. This step can be performed in any suitable way. In at least some embodiments, the input message is received by a manipulation thread and placed into a queue. Step 304 sends the input message to an independent hit test thread. Responsive to receiving the input message, the independent hit test thread performs an independent hit test. Step 308 calls a user interface thread to perform a full hit test. Examples of how and why this can be done are provided above. Step 310 ascertains whether a region associated with the input is an independent region. If the region is ascertained to be an independent region, then step 312 calls the manipulation thread for direct manipulation. An example of how this can be done is provided above. If, on the other hand, the region is ascertained to not be independent, i.e. dependent, then step 314 reassigns the input message to the user interface thread for processing.

Using a Scoped Tree Traversal for Independent Hit Testing

In one or more embodiments, a scoped tree traversal can be performed during the independent hit test. In these instances, the independent hit test need not conduct a full tree traversal to determine an appropriate response. Rather, portions of a corresponding display tree can be skipped when they are ascertained to be irrelevant with respect to the independent hit test.

In at least some embodiments, the elements of the display tree can be marked such that those elements are traversed during independent hit testing. Alternately, the elements of the display tree can be marked such that marked elements are not traversed during independent hit testing. In this manner, marking the display tree can determine whether or not elements are traversed during independent hit testing.

For example, there are characteristics and properties of elements in a display tree that do not lend themselves naturally to doing a hit test because of their function within the display tree. In those cases, these elements are marked so that they will not be hit tested. In a specific example, some elements in a display tree, because of their properties and characteristics, are processed by a display client. Such elements can include a range control. In these instances, the display node corresponding to the range control is a container with several nodes underneath it corresponding to the parts of the control. However, the range control itself does special processing of touch input on the user interface thread, so it implements a display client to do that processing and marks its display node as not-for-traversal. Thus, when the display node is encountered by the independent hit test thread, it skips traversal of the nodes underneath the range control.

Designating Specific Regions of a Display Tree Node for Independent Hit Testing

In at least some embodiments, specific regions of the display tree node can be designated for consideration during independent hit testing. This approach can be used in instances where a single display tree node has sub-regions of interest that may change a decision about the appropriate manipulation response. Example sub-regions include, by way of example and not limitation, a playback slider on a video element or a resize gripper on editable content.

Consider a display tree node in the form of a rectangle that has some content inside of it. An example of a display tree node may be one that includes video content. If the user touches the region corresponding to this display tree node, controls such as fast-forward, pause, volume, and the like may appear. Normally, it is desirable to process contacts on the particular video control in the normal, usual way such as by fast forwarding, pausing, or adjusting the volume of the video. Normally, when these controls are visible, these types of inputs are handled by the user interface thread. However, manipulations such as panning and zooming the display element corresponding to the video content can be done independently using independent hit testing. In this instance, the controls may be visible and the input that is received comprises a pinch or a pan input on the video which will result in the independent hit test thread processing the input message to affect the corresponding manipulation.

In one or more embodiments, a separate data structure is maintained as part of the display tree corresponding to these types of elements. The separate data structure maintains information for these types of display nodes. Depending on the input that is received, either the user interface thread will process the input messages in cases where, for example, input occurs on a video control, or the independent hit test thread and manipulation thread will process input with respect to these elements when panning or zooming occurs.

Registering a Callback Handler to be Executed as Part of the Response to an Independent Hit Test Consider situations in which a user pans to the left or right with respect to content that is displayed by their web browser. Panning to the right is the equivalent of clicking the back button to navigate backwards in the browser. Accordingly, a user can flip back and forth through various pages. This enables a user to navigate backwards and forwards through a travel log associated with a navigation. In this instance, backward and forward navigation through content is handled by a different component than the independent hit test thread. In these instances, the component that handles backward and forward navigation can register for a callback as part of the response to an independent hit test.

Consider, for example, an I-frame and a corresponding webpage. Responsive to a panning manipulation, the I-frame pans first until it hits an edge, at which point the page starts to pan. Once the page hits its edge, then a backward navigation can be initiated. By registering a callback handler to be executed as part of the response to an independent hit test, the host can participate in this chain. For example, when a finger down input is received, a list of all of the scrollable regions up the display tree associated with that input is built. So, for example, if a user touches on a region that is ten scrollable areas deep, then the independent hit test thread can call the manipulation thread for each of those ten scrollable areas so that manipulation can occur. Using a callback handler as part of the response to the independent hit test can enable the component that processes backward and forward navigation to layer on top of those ten regions to effect backward and forward navigation as appropriate.

Declarative Style Rules for Default Behaviors

In at least some embodiments, a mechanism is provided for web developers to request specific default behaviors, such as touch behaviors, on their webpages. In at least some implementations, a Cascading Style Sheets rule is utilized to enable or disable manipulations such as panning, pinch zoom, and double-tap-zoom manipulations. The mechanism can be extensible to accommodate additional default behaviors that are added in the future. In various embodiments, the behaviors are declared up front and thus differ from solutions which employ an imperative model. The declarative nature of this approach allows achievement of full independence from the main thread and deciding the correct response using independent hit testing.

In one or more embodiments, the ability to control default actions, such as touch actions, is provided through the use of a new CSS property "touch-action". The CSS property accepts values including, by way of example and not limitation, "auto", "none", and "inherit". In addition, the CSS property is extensible insofar as enabling the use of a space delimited list of specific actions, such as touch actions, that may be utilized. By way of example and not limitation, this list includes the values "manipulation" and "double-tap-zoom" to control pan/pinch-zoom and double-tap-zoom, respectively. Additional capabilities can be added which can be enabled or disabled with this feature, thus adding extensibility to this property.

In one or more embodiments, the correct response after independent hit testing is that the first ancestor of the target which can handle a touch interaction does so. For manipulations, this may include regions which are actually manipulable, i.e. have been designated as scrollable or zoomable, as well as elements which choose to handle interaction via JavaScript, e.g. "touch-action: none". This can also include certain elements which have their own manipulation response, e.g., sliders.

In operation, during independent hit testing which determines the particular element on the webpage that is under a user's finger, the corresponding display tree is traversed based, in part, on this CSS property. This enables scoping of the tree traversal in cases where no additional information is needed to determine the correct response.

Having considered an overview on declarative style rules for default behaviors, consider now a discussion of an implementation example that employs the techniques described above.

Implementation Example

In the discussion below, the following terminology is used. A manipulable element is an element which either: (a) has overflow content and specifies overflow is to be automatically handled, (b) specifies that scrolling is allowed for overflow content, or (c) has zooming capabilities. A manipulation-blocking element is an element that explicitly blocks direct manipulation via declarative markup and, instead, will fire gesture events such as gesture start, gesture change, and gesture end events. A manipulation-causing element is an element which explicitly requests direct manipulation via declarative markup. A passive element is an element which does not fall into the three categories above. It does not contribute to the touch action decision.

With respect to the CSS property "touch action" consider the following. The "touch action" property includes the following values that can be set by web developers using declarative markup: auto, none, inherit, and <space-delimited gesture list>. The space-delimited gesture list can include "manipulation" and "double-tap-zoom". The space-delimited gesture list is also extensible to support future added gestures.

The "auto" value defers a touch-action decision to the parent of a particular element, thus making the particular element a passive element. So, for example, if a touch input occurs on an element that itself cannot pan and has not blocked a pan manipulation, the touch-action decision is deferred up to the element's parent. This can continue scrolling up the chain of the element's ancestors until the touch-action decision is resolved, resulting either in a manipulation or no manipulation. This value can alleviate having to specify properties on every single element in a display tree chain.

The "none" value specifies that no panning or zooming is to occur on this element.

The "inherit" value specifies that the element inherits its property value from its parent, per standard CSS inheritance.

The "manipulation" value specifies that the associated element is to be treated as a manipulation-causing element, i.e., an element which explicitly requests direct manipulation. Accordingly, this element will pan and/or zoom and no gesture events will fire.

The "double-tap-zoom" value specifies that the associated element is to be treated as a manipulation-blocking element meaning that the element explicitly blocks direct manipulation and will instead cause gesture events to be fired. In this instance, if only "double-tap-zoom" is specified for an element, the element will not pan or pinch zoom. Note that if "manipulation" is specified for an element but "double-tap-zoom" is not specified, the element can only be panned and pinch zoomed.

In operation, manipulations are assigned to the first manipulable or manipulation-blocking element in the target element's parent chain. In the event that the element is both manipulable and manipulation-blocking, direct manipulation does not occur meaning that manipulation-blocking occurs. If there is no manipulable or manipulation-blocking element in the target element's parent chain, manipulation events are sent or fired.

Consider now how the above values are processed during independent hit testing. When the display tree is initially built for a particular page, if the above-described property values are encountered, a flag is pushed onto each display tree node that corresponds to a particular element for which a property value specified. Thus, each display tree node carries with it its state as defined by the above-described property values.

During independent hit testing, the display tree is walked and these flags are accumulated to ascertain whether the independent hit test thread should call the manipulation thread for direct manipulation. These flags are essentially built up in a manner described above and then assigned to a viewport which ultimately decides how the page or content will pan, zoom, or be manipulated. Thus, manipulations can be configured on-the-fly based on hit test results. Once the independent hit test is completed and the configuration is ascertained, the independent hit test thread can make the appropriate calls to the manipulation thread for direct manipulation.

Figure 3A:
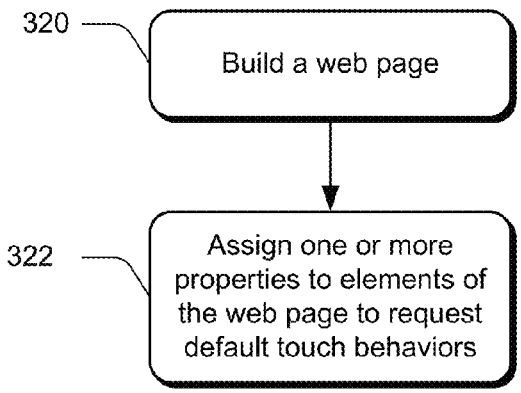
FIG. 3a is a flow diagram that describes steps in a method in accordance with one or more embodiments.

FIG. 3a is a flow diagram that describes steps in a method in accordance with one or more embodiments. The method can be implemented in connection with any suitable hardware, software, firmware, or combination thereof. In at least some embodiments, the method can be implemented by a suitably-configured web page development system that includes software enabling a developer to develop a web page.

Step 320 builds a webpage. This step can be performed in any suitable way using any suitably-configured webpage development software package. Step 322 assigns one or more properties to elements of the webpage to request one or more respective default touch behaviors. Examples of how this can be done are provided above.

Figure 3B:
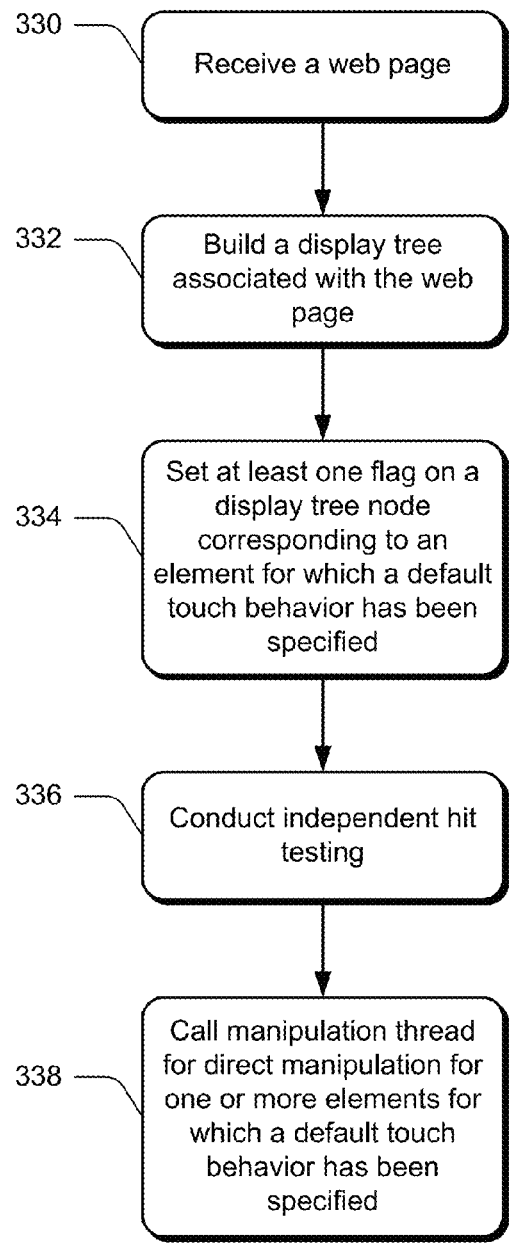
FIG. 3b is a flow diagram that describes steps in a method in accordance with one or more embodiments.

FIG. 3b is a flow diagram that describes steps in a method in accordance with one or more embodiments. The method can be implemented in connection with any suitable hardware, software, firmware, or combination thereof. In at least some embodiments, the method can be implemented by a suitably-configured system such as one that includes, among other components, an independent hit test component such as that described above.

Step 330 receives a webpage. Step 332 builds a display tree associated with the webpage. Step 334 sets at least one flag on a display tree node corresponding to an element for which a default touch behavior has been specified. Examples of how this can be done are provided above. Step 336 conducts an independent hit test on the display tree. Examples of how this can be done are provided above. Step 338 calls a manipulation thread for direct manipulation for one or more elements for which a default touch behavior has been specified. Examples of how this can be done are provided above.

Having considered various embodiments, consider now an example system and device they can be utilized to implement the embodiments described above.

Example System and Device

Figure 4:
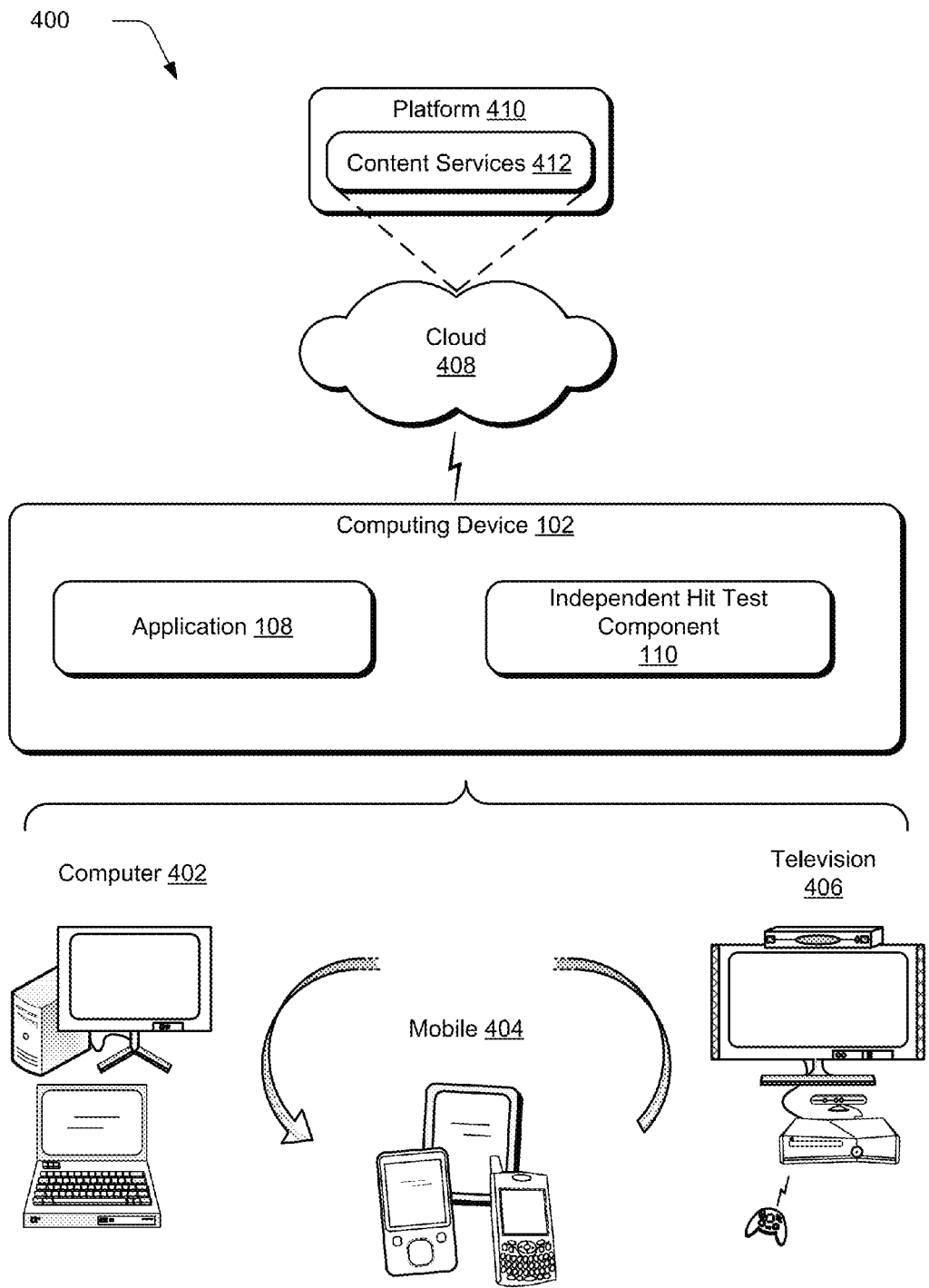
FIG. 4 illustrates an example system that includes the computing device as described with reference to FIG. 1.

FIG. 4 illustrates an example system 400 that includes the computing device 102 as described with reference to FIG. 1. The example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 402, mobile 404, and television 406 uses. Each of these configurations includes devices that may have generally different constructs and capabilities, and thus the computing device 102 may be configured according to one or more of the different device classes. For instance, the computing device 102 may be implemented as the computer 402 class of a device that includes a personal computer, desktop computer, a multi-screen computer, laptop computer, netbook, and so on. Each of these different configurations may employ the techniques described herein, as illustrated through inclusion of the application 108 and independent hit test component 110.

The computing device 102 may also be implemented as the mobile 304 class of device that includes mobile devices, such as a mobile phone, portable music player, portable gaming device, a tablet computer, a multi-screen computer, and so on. The computing device 102 may also be implemented as the television 406 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 408 includes and/or is representative of a platform 410 for content services 412. The platform 410 abstracts underlying functionality of hardware (e.g., servers) and software resources of the cloud 408. The content services 412 may include applications and/or data that can be utilized while computer processing is executed on servers that are remote from the computing device 102. Content services 412 can be provided as a service over the Internet and/or through a subscriber network, such as a cellular or Wi-Fi network.

The platform 410 may abstract resources and functions to connect the computing device 102 with other computing devices. The platform 410 may also serve to abstract scaling of resources to provide a corresponding level of scale to encountered demand for the content services 412 that are implemented via the platform 410. Accordingly, in an interconnected device embodiment, implementation of functionality described herein may be distributed throughout the system 400. For example, the functionality may be implemented in part on the computing device 102 as well as via the platform 410 that abstracts the functionality of the cloud 408.

Figure 5:
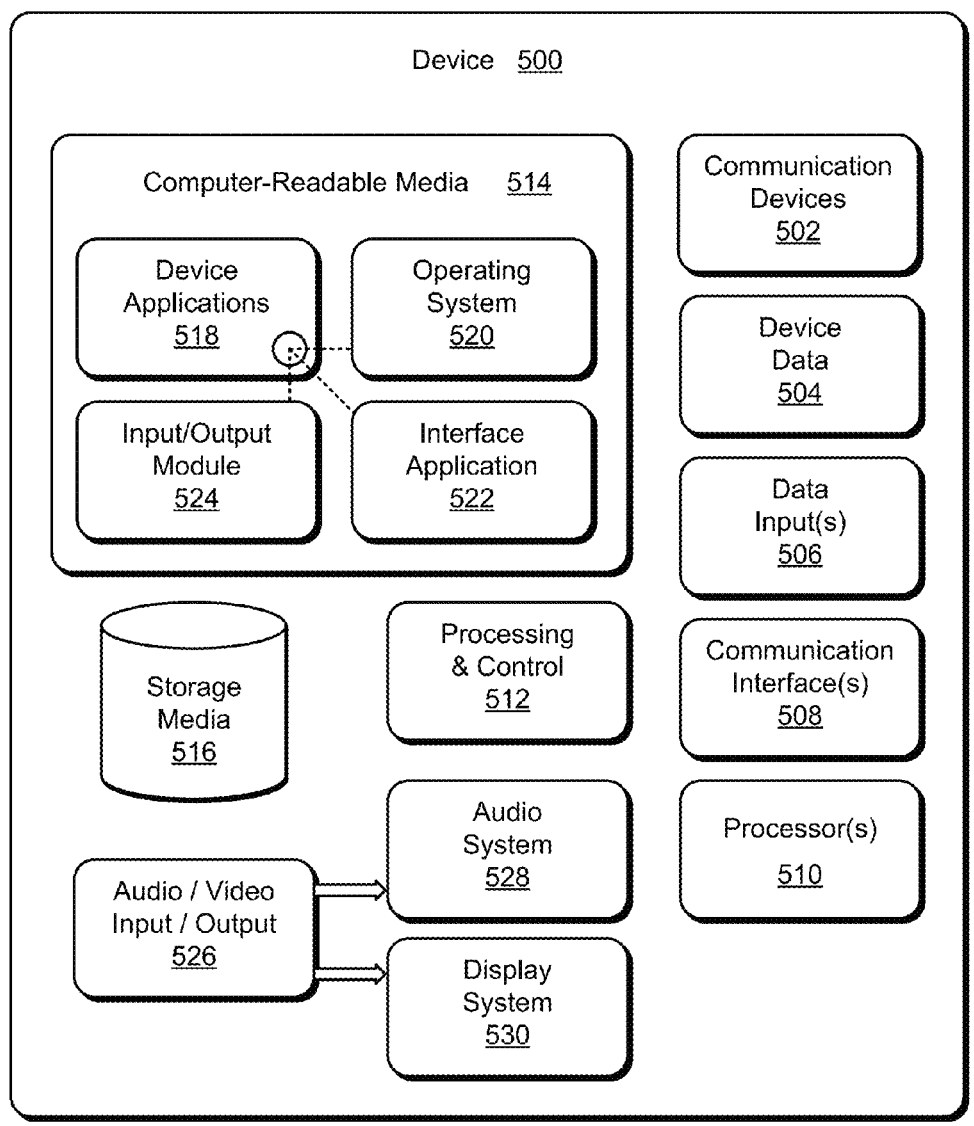
FIG. 5 illustrates various components of an example device that can be implemented as any type of computing device as described herein.

FIG. 5 illustrates various components of an example device 500 that can be implemented as any type of computing device as described with reference to FIGS. 1 and 5 to implement embodiments of the techniques described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the techniques described herein. In this example, the device applications 518 include an interface application 522 and an input/output module 524 that are shown as software modules and/or computer applications. The input/output module 524 is representative of software that is used to provide an interface with a device configured to capture inputs, such as a touchscreen, track pad, camera, microphone, and so on. Alternatively or in addition, the interface application 522 and the input/output module 524 can be implemented as hardware, software, firmware, or any combination thereof. Additionally, the input/output module 524 may be configured to support multiple input devices, such as separate devices to capture visual and audio inputs, respectively.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

CONCLUSION

In one or more embodiments, a hit test thread which is separate from the main thread, e.g. the user interface thread, is utilized for hit testing on web content. Using a separate thread for hit testing can allow targets to be quickly ascertained. In cases where the appropriate response is handled by a separate thread, such as a manipulation thread that can be used for touch manipulations such as panning and pinch zooming, manipulation can occur without blocking on the main thread. This results in the response time that is consistently quick even on low-end hardware over a variety of scenarios.

In at least some embodiments, a mechanism is provided for web developers to request specific default behaviors, such as touch behaviors, on their webpages. In at least some implementations, a Cascading Style Sheets (CSS) rule is utilized to enable or disable manipulations such as panning, pinch zoom, and double-tap-zoom manipulations. The mechanism can be extensible to accommodate additional default behaviors that are added in the future. In various embodiments, the behaviors are declared up front and thus differ from solutions which employ an imperative model. The declarative nature of this approach allows achievement of full independence from the main thread and deciding the correct response using independent hit testing.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. One or more computer-readable storage media embodying computer-readable instructions which, when executed, implement a method comprising:
   building a display tree associated with a webpage that has been received;
   setting at least one flag on a display tree node of the display tree associated with the webpage corresponding to an element for which a default touch behavior has been specified using a declarative style;
   conducting an independent hit test on the display tree associated with the webpage; and
   calling a manipulation thread for direct manipulation of one or more elements for which a default touch behavior has been specified.

2. The one or more computer-readable storage media of claim 1, wherein the default touch behavior comprises enabling or disabling a panning manipulation.

3. The one or more computer-readable storage media of claim 1, wherein the default touch behavior comprises enabling or disabling a pinch zoom manipulation.

4. The one or more computer-readable storage media of claim 1, wherein the default touch behavior comprises enabling or disabling a double-tap-zoom manipulation.

5. The one or more computer-readable storage media of claim 1, wherein the declarative style is associated with a property having a value that defers a touch-action decision to a parent of an element.

6. The one or more computer-readable storage media of claim 1, wherein the declarative style is associated with a property having a value that disables a manipulation.

7. The one or more computer-readable storage media of claim 1, wherein the declarative style is associated with a property having a value that causes an associated element to be treated as a manipulation-causing element.

8. The one or more computer-readable storage media of claim 1, wherein the declarative style is associated with a property having a value that causes an associated element to be treated as a manipulation-blocking element.

9. A system comprising:
one or more processors; and
one or more computer-readable storage media embodying computer-readable instructions which, when executed by the one or more processors, implement a method comprising:
receiving a webpage;
building a display tree associated with the webpage;
setting at least one flag on a display tree node of the display tree associated with the webpage corresponding to an element for which a default touch behavior has been specified using a declarative style;
conducting an independent hit test on the display tree associated with the webpage; and
calling a manipulation thread for direct manipulation of one or more elements for which a default touch behavior has been specified.

10. The system of claim 9, wherein the default touch behavior comprises enabling or disabling a panning manipulation.

11. The system of claim 9, wherein the default touch behavior comprises enabling or disabling a pinch zoom manipulation.

12. The system of claim 9, wherein the default touch behavior comprises enabling or disabling a double-tap-zoom manipulation.

13. A computer-implemented method comprising:
building a display tree associated with a webpage that has been received;
setting at least one flag on a display tree node of the display tree associated with the webpage corresponding to an element for which a default touch behavior has been specified using a declarative style;
conducting an independent hit test on the display tree associated with the webpage; and
calling a manipulation thread for direct manipulation of one or more elements for which a default touch behavior has been specified.

14. The computer-implemented method of claim 13, wherein the default touch behavior comprises enabling or disabling a panning manipulation.

15. The computer-implemented method of claim 13, wherein the default touch behavior comprises enabling or disabling a pinch zoom manipulation.

16. The computer-implemented method of claim 13, wherein the default touch behavior comprises enabling or disabling a double-tap-zoom manipulation.

17. The computer-implemented method of claim 13, wherein the declarative style is associated with a property having a value that defers a touch-action decision to a parent of an element.

18. The computer-implemented method of claim 13, wherein the declarative style is associated with a property having a value that disables a manipulation.

19. The computer-implemented method of claim 13, wherein the declarative style is associated with a property having a value that causes an associated element to be treated as a manipulation-causing element.

20. The computer-implemented method of claim 13, wherein the declarative style is associated with a property having a value that causes an associated element to be treated as a manipulation-blocking element.

* * * * *